Oct. 4, 1927.
J. C. BROWN
1,644,366
MEANS FOR PICKING UP OBJECTS AND ARTICLES
Filed April 26, 1920   2 Sheets-Sheet 2
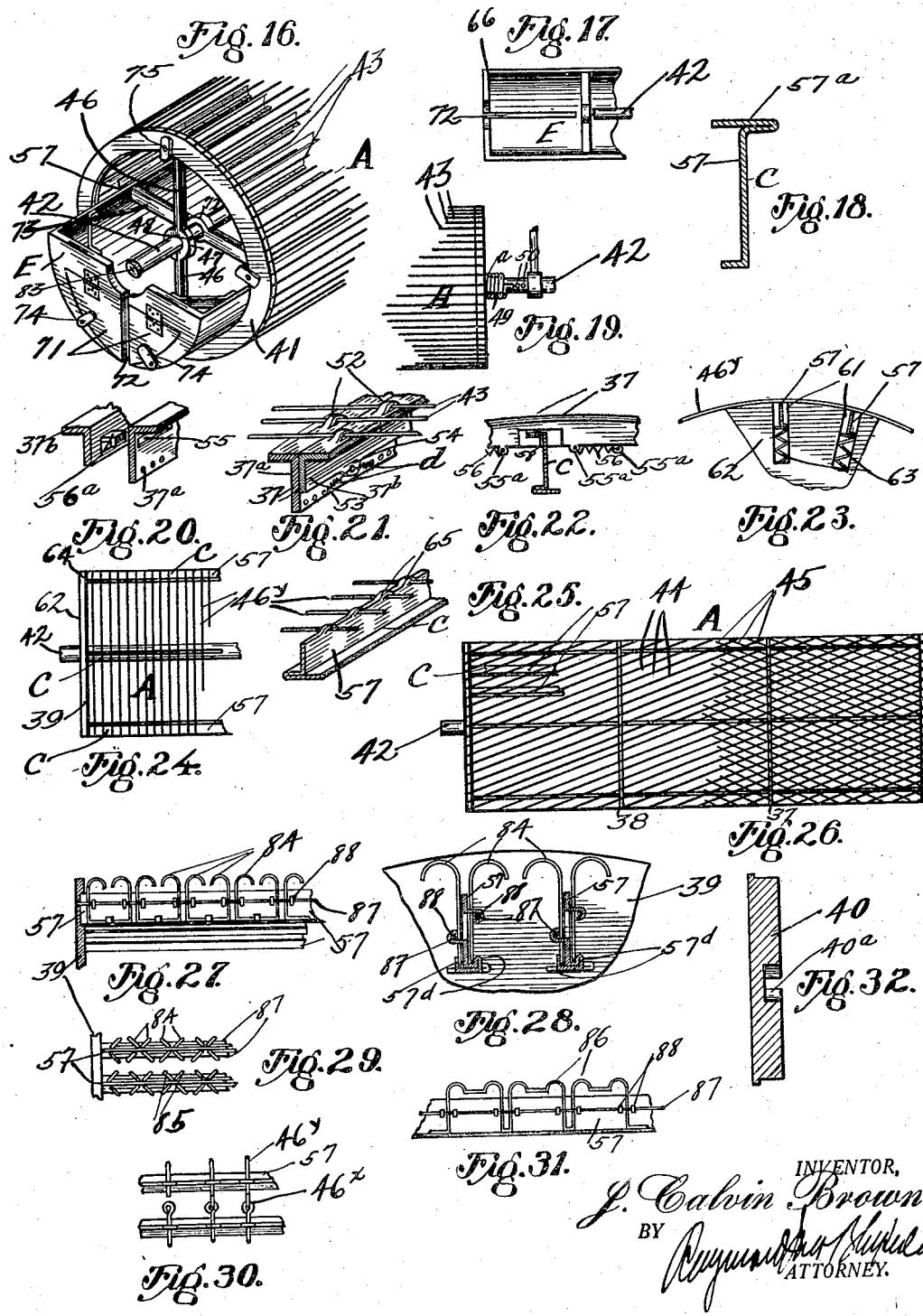
INVENTOR,
J. Calvin Brown;
BY
ATTORNEY.

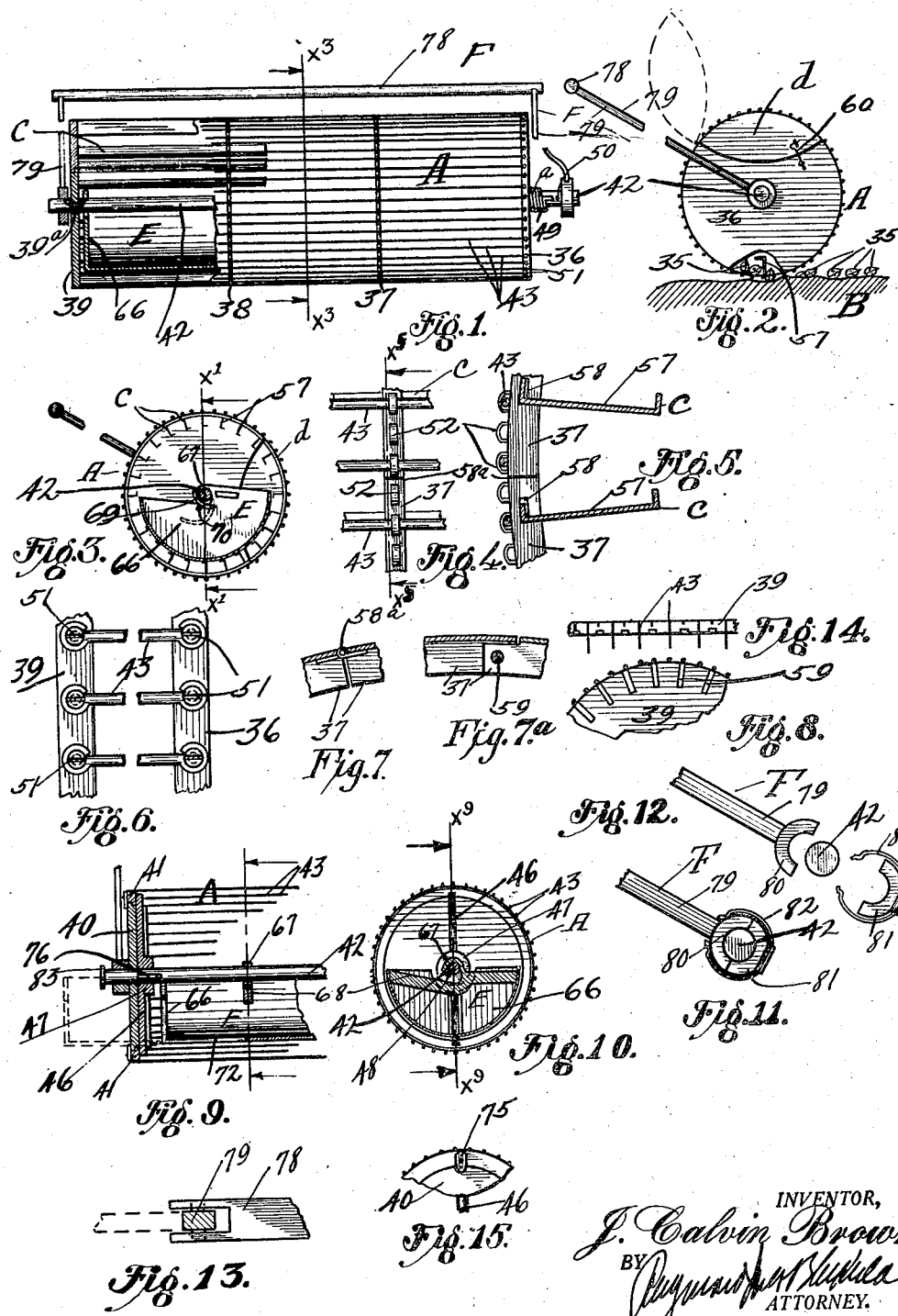

Patented Oct. 4, 1927.

1,644,366

UNITED STATES PATENT OFFICE.

JASPER C. BROWN, OF LOS ANGELES, CALIFORNIA, ASSIGNOR OF ONE-HALF TO RAYMOND IVES BLAKESLEE, OF LOS ANGELES, CALIFORNIA.

MEANS FOR PICKING UP OBJECTS AND ARTICLES.

Application filed April 26, 1920. Serial No. 376,670.

This invention relates to means for picking up objects and articles, and has for its object to provide means whereby objects, irrespective of size, shape or dimensions, may be picked up or recovered from a surface. In its preferred embodiment the invention is organized or constructed to include a member or members which when moved over in engagement with objects to be picked up or recovered automatically opens sufficiently to receive the object or article and pass it into a chamber whence a plurality of such picked-up objects may readily be removed for storage.

In practicing the invention I preferably provide a rotating drum, with suitable handle or operating means, the drum being substantially cylindrical and its cylindrical walls consisting of relatively movable parts which automatically separate when brought to bear against an object or article, so as to permit the object or article to be passed between the relatively movable parts and so on into the interior of the drum or into a receptacle or container therein. When the object or article has so passed between these relatively movable parts, which in nature or in mounting are yielding or resilient or both, such relatively movable parts are automatically restored to their normal relations and positions so as to be ready to be presented to and to accommodate and receive and pass between them further objects or articles. The drum preferably is provided with a plurality of such relatively movable parts so that a great number of objects or articles may be presented to the drum and passed into its interior in a single rotation of the drum. Thus the invention is of great value for the purpose of picking up and recovering nuts and fruit and certain vegetables, and other farm, orchard and garden products.

One particularly advantageous use for the present invention consists in the picking up and recovering of walnuts which are extensively produced in large groves. It is the usual practice in harvesting walnuts to shake the limbs of the trees and dislodge the nuts which are then picked up from the ground by hand. Not only is this work tedious, necessitating as it does a stooping posture of the nut gatherer, but it is extremely slow, and frequently nuts must of necessity be overlooked because the vision of the worker is entirely depended upon in locating the nuts. In the use of the present invention it is only necessary to move the device or nut gatherer over the surface of the ground, to pick up practically all of the nuts in a given area traversed. Furthermore, any foreign objects such as sticks, twigs, lumps of dirt and the like will be rejected by the gatherer, which will securely retain the recovered nuts, but will permit such extraneous objects to sift and fall out, leaving within the container only the recovered nuts.

To that end I preferably provide within the rotating drum a plurality of lifting or elevating members which raise the nuts prior to their being ready to fall into the receptacle or container, and thus these extraneous objects are discarded through the cylindrical drum wall, leaving only the nuts to be deposited in the container.

Another great advantage of this invention consists in the fact that the weight of the accumulating recovered objects or articles is not imposed upon the arm of the operator, as it is in crude impaling and single-object seizing devices. The weight is easily carried within the revolving drum without requiring any particular effort on the part of the operator who rolls or rotates the drum.

The rotating drum is made of sufficient diameter so that any kind of ground or surface ordinarily encountered in recovering performance will be accommodated as to its unevenness or roughness, without interfering with the picking up or recovering operation, and each object or article is subjected to an extended period of engagement by the drum during any portion of which period it may be recovered if recovery has in any manner been obstructed or failed to be effected in an earlier portion of such period. In this one particular field of walnut recovery it requires an hour's time of a nut gatherer to pick up all the walnuts shaken from a full grown, heavily laden English walnut tree, whereas my invention will easily, comfortably and with maximum efficiency recover, pick up and gather all of these walnuts in not over five minutes' time. The saving both in time and because of high efficiency, in a given walnut groove, thus runs into very high figures.

It is obvious that many other uses and adaptations of the invention may be made, both out of doors and within shops and dwellings, and wherever scattering objects and articles reasonably agreeing in size and dimensions are required to be picked up and recovered for further disposition.

The invention has for further objects the provision of improved means of the nature stated which will be superior in point of relative simplicity and inexpensiveness of construction and organization, taken in conjunction with positiveness and efficiency and convenience and comfort and economy in operation, durability, freedom from necessity of repair, compactness in form, and which will be generally superior in efficiency and serviceability and low cost of operation and use.

The invention consists in the novel and useful provision, formation, construction, combination, association and relative arrangement of parts, members and features, all as hereinafter described, shown in the drawings, and finally pointed out in claims.

In the drawings:

Figure 1 is a fragmentary front elevation, partly in section of one form of the invention.

Figure 2 is a fragmentary end view of the invention shown in Fig. 1;

Figure 3 is a detail transverse sectional view, partly in elevation, taken upon the line $x^3$—$x^3$, Figure 1;

Figure 4 is a detail enlarged fragmentary elevation of part of the structure shown in Figure 1;

Figure 5 is a detail sectional view upon the line $x^5$—$x^5$, Figure 4, and looking in the direction of the appended arrows;

Figure 6 is a detail fragmentary elevation of certain members of the structure shown in Figure 1;

Figure 7 is a detail fragmentary sectional view of hinge means for the closure part of the drum shown in Figures 1 and 2;

Figure 7$^a$ is a fragmentary sectional view of another form of hinge means for the closure part of the drum.

Figure 8 is a fragmentary view of one of the end members.

Figure 9 is a detail longitudinal sectional fragmentary view taken upon the line $x^9$—$x^9$, Figure 10, and looking in the direction of the appended arrows;

Figure 10 is a detail transverse sectional view, taken upon the line $x^{10}$—$x^{10}$, Figure 9, and looking in the direction of the appended arrows;

Figure 11 is a fragmentary end view of the construction shown in Figures 1 and 2, showing a detail of means for attaching the handle to the drum axis;

Figure 12 is a view similar to Figure 11 showing the details of Fig. 11 in extended relation;

Figure 13 is an enlarged detail fragmentary view, showing features of handle details for the drum;

Figure 14 is a plan view of Figure 8;

Figure 15 is a detail of the retaining catch for holding a detachable end frame member of the drum in position;

Figure 16 is an isometric fragmentary view of a modified form of the construction shown in Figures 1, 2, 3 and 9;

Figure 17 is a plan view showing details of the receiving bin.

Figure 18 is a cross section of elevating means for the recovered articles or objects;

Figure 19 is a detail showing tension means for an end member of the drum;

Figure 20 is a detail of the frame construction of the drum;

Figure 21 is a similar view showing further features of such drum frame construction;

Figure 22 is a detail modification of Figure 21;

Figure 23 is a detail modification of Figure 24;

Figure 24 is a detail modification of the drum construction;

Figure 25 is a detail modification of Figure 21;

Figure 26 suggests another modification for the drum;

Figure 27 suggests a modification for the drum;

Figure 28 is a detail of the modification of Figure 27;

Figure 29 is a detail plan of the construction shown in Figure 27;

Figure 30 is a detail of another modification of the drum of the form shown in Figure 27; and, Figure 31 is an elevation of the detail shown in Figure 30.

Figure 32 is a transverse sectional view of an end closure for such drums as shown in Figure 16, the same being in detached position.

Corresponding parts in all the figures are designated by the same reference characters.

Referring with particularity to the drawings, I have shown therein, as included in means for picking up or recovering objects or articles or spoil of various descriptions, drum A adapted to traverse a surface upon which such objects or articles may be disposed, such articles being indicated in Figure 2 as walnuts 35, which in that figure are shown as being recovered or picked up by such member A from the uneven surface of ground formation B.

These drums comprise each an end member 36 to which tension may be applied by tension means $a$, and other members 37, 38 and 39, of which the members 37 and 38 are intermediate the members 36 and 39 and are annular, the member 39 being, as is member 36, an end member. An end member 41 may be provided as in Figure 9, the same having a detachable closure 40. 42 designates a shaft extending lengthwise of the drum, in its axis, such drum being preferably substantially cylindrical; and extending between and over the members 36, 37, 38 and 39 or 40 are relatively movable parts 43 in Figures 1, 16 and 19, and 44 and 45 in Figure 26. The end member 36 is keyed upon the shaft 42, and the member 41 is held in position surrounding the shaft 42, such member 41 being annular, by radial arms 46 which are joined by a hub 47 locked to the shaft 42 by a pin or set screw 48. The end member 39 is fast to the shaft 42 as shown at $39^a$ in Figure 1, being pinned thereto so as to prevent its movement along the shaft. The tension means $a$ may comprise a coil contractile spring 49 one end of which is fitted into one of a number of openings 50 in the shaft 42, and the other end of which is attached to the end drum frame member 36. It thus occurs that the relatively movable parts 43 or 44 and 45 are affected tensionally to stretch them lengthwise so that their relative separation or relative movement caused by the passage between them of an object or article, will be yieldingly opposed. These relatively movable parts 43, 44 and 45 may consist of wires secured at their ends to the end frame members of the drums, as by looping the ends thereof around pins 51 applied to such end frame members. These wires may pass through eyes 52 upon the intermediate frame members such as 37 and 38, which eyes may be formed by striking up and puncturing the material of the frame members. These intermediate frame members may consist of separate portions, as $37^a$ and $37^b$, having the eyes 52 in staggered arrangement, such separate portions being relatively movable, and each being annular and being held in position by the relatively movable parts 42, 43, 44 and 45 bearing under tension upon them, and also held in position by elevating means C, to be described hereinafter. These relatively movable portions $37^a$ and $37^b$, which are shown in reverse positions in Figure 20, are opposed as to relative movement in concentric paths by tension means $d$ consisting of contractile springs 53 connected each at one end with the portion $37^a$, which is deeper than the portion $37^b$, and also connected each at one end with a lug 54 upon the portion $37^b$. These portions $37^a$ and $37^b$ may be formed of angle irons as shown, and one of them may be slotted as at 55 to receive struck-out angled hooks $56^a$ in the other, having play in such slots 55, and keeping the portions from separating superficially while maintaining them in parallel relation. In Figure 22 is shown a modified form of construction wherein the two portions of the frame member 37 are provided each with two lugs $55^a$ and contractile tension springs 56, operating in opposite directions, extend in each instance between one lug on one portion and one lug on the other portion.

The elevator means C comprise a plurality of flights or ledges or inwardly projecting members 57 which are loosely fitted into slots 58 in the frame members 37 and 38 of the drums A, such flights having angular end portions, and the slots 58 being angular to receive them, these flights also fitting into limiting slots 59 in the end members of the drum such as 36 and 39. The flights project inwardly substantially radially of the drums, and on the rotation of the drums serve to pick up or elevate articles or objects squeezed into the drums between the relatively movable parts 43 and the like. A modified form of such elevating means C is shown in Figure 18, the flight 57 being angled in both directions at its outer end, as at $57^a$ so as to be capable of elevating upon rotation of the drum in both directions.

The drum A shown in Figures 1, 2 and 3 has a hinge portion $d$ which is formed by hinging together portions of the end and intermediate frame members, as at $58^a$, and a pin 59 may be employed in overlapping portions of such annular frame members to hold the hinge portions in closed position; or a latch 60 as shown in Figure 2 may be employed to that end, at each end of the drum.

A modified form of drum construction is shown in Figure 24, the drum A therein shown having the relatively movable parts $46^y$, extended in planes transverse to the shaft 42 or in ring formation, and spaced apart lengthwise of the drum. These wires $46^y$ pass over elevator members or flights 57 which are utilized without using intermediate frame members such as 37 and 38, but which at their ends are slidably mounted in radial slots 61 provided in the end drum members 62 which are keyed to the shaft 42. Compression springs 63 are provided in the slots 61 inward of the elevator flights 57 and urging the same outwardly against annular hoops 64 which surround the end frame members 62. The outward pressure of the springs 63 operating through the flights 57 puts the wires $46^y$ under yielding pressure serving to oppose relative separation of such wires in the passage of objects between the same in the picking up of such objects. These wires $46^y$ are separate as to each unit included in the drum cylindrical formation, and the ends of the wires in each instance are hooked or eyed together, as at $46^x$. The elevator flights 57 are provided with eyes 65 through which are passed the several wires $46^y$, the wires thus being maintained in spaced relation. I have illustrated a tray, receptacle or container E which is sector shaped, having a bottom wall curvature of substantially 180 degrees, closed at the ends, as at 66 and suspended at its top by hooks 67 connected with transverse braces 68 and applied to and over the shaft 42, thus being pendent from the shaft and always being in upright position to receive objects recovered by the drum and directed to it by the elevator means C and the flights 57 thereof. Access is had to such receptacle E in Figures 1, 2 and 3 through the hinged member $d$, which is lifted so as to permit the spoil to be taken out of the receptacle E, such receptacle being merely freed from the shaft 42 by lifting it and withdrawing the hooks 67 from such shaft. The receptacle E is held in place by hinged curved fingers 69 on the end of the receptacle E and held in shaft-engaging position by detachable pins 70 seated in openings in the end members 66 of the receptacle. In the form of construction shown in Figures 9 and 10, the receptacle E is shown as simply suspended by hooked fingers 67 upon the shaft 42 and is capable of being either lifted from such shaft and taken out through an opening in the drum provided by springing up a hinged portion such as the portion $d$ in Figure 2; or it may be caused to slide lengthwise on the shaft 42 so as to be projected beyond one end of the drum A, which may be opened up by removing a detachable closure 40 from an end frame member such as 41. When the receptacle is to thus be moved endwise of the drum the frame member 41 at the end is provided with the transverse or diametrical brace 46 shown likewise in Figure 16, and the tray or receptacle E is slotted lengthwise, part way, as at 72, to accommodate such movement of the tray or receptacle. Likewise a transverse brace 73 is provided in the tray or receptacle. This construction is likewise shown in Figure 16. In Figure 16, however, the tray or receptacle E is shown as provided with hinged end doors 71, and holding buttons or catches 74 are provided for holding the same shut. Similarly, holding buttons 75 are provided upon the end members 41 for holding the detachable end 40 in place. The brace 46 is keyed to the shaft 42 as shown at 76. The brace 73 in Figure 16 is provided with a hub 77 which loosely surrounds the shaft 42, and this is in substitution for the hook 67 in the other figures, and in Figure 16 this form is employed inasmuch as the receptacle E is made accessible only by sliding it along the shaft and not by lifting it from the shaft.

In Figure 26 the wires 44 and 45 are shown as extending lengthwise of the drum A diagonally, so as to provide a criss-cross arrangement, providing a plurality of four-walled openings through which the objects or articles to be recovered are squeezed or passed into the interior of the drum.

The means F for operating or moving the drum A comprises a handle member 78 which is provided at its ends with detachably fitted arms 79 extending to the shaft 42 and at their ends where so connected with the shaft they are provided with two-part bearings 80, 81, adapted to embrace the shaft and to be held thereto by a spring clip 82, and capable of being removed as, for instance, to permit the endwise movement of the tray or receptacle E. A screw cap or the like 83 may be provided at each end of the shaft 42 to confine such bearings 80, 81, and prevent the same from inadvertently leaving the shaft ends. This is true of the form where the tray E is to be projected beyond the end of the drum. In the other form, as in Figures 1 and 2, the bearings may be applied to the shaft 42 in such a manner as to oppose any endwise movement on the shaft, or at least not to provide for any such endwise movement.

In Figures 27, 28, 29 and 31 are shown spring fingers 84, 85 and 86 respectively, which are detachably mounted upon the elevator flights 57 and which may be utilized in place of the relatively movable members or wires 43, 44, 45 and 46, to receive, on relative separation, the devices or objects to be passed into the drum. In using these forms no special tension means such as the tension means $a$ or the tension springs 63 are required, inasmuch as the fingers themselves have inherent spring or tensional quality which causes them to move toward and from each other or to act effectively in accommodating objects or articles passed between them and into the drum. These fingers may be conveniently held to the elevator flights 57 by binding wires 87 passed through struck-up eyes 88 in the flights 57, and the flights 57 may be angled at their inner portions, as at $57^d$ to accommodate the bases or inner portions of these spring fingers. The spring fingers are inwardly directed or directed toward each other.

The operation, method of use and advantages of the means for picking up or recovering or gathering objects or articles in practicing the invention will be readily understood from the foregoing description and the accompanying drawings.

The drum A is moved over the ground or other surface upon which the objects or articles rest, and the pressure of the drum downwardly due to gravity, causes the objects or articles to be borne upon by the relatively movable parts or wires 43, 44, 45 and $46^y$ or the spring fingers 84, 85 or 86, so that a tendency is created for such relatively movable parts or wires or fingers to relatively separate under the pressure caused, such relative separation being the resultant of such pressure, together with the yielding opposition of the wires or relatively movable parts, such opposition being set up by the tension spring 49 or the tension springs 53, 56 or 63. The relative separation permits the objects or articles, such as the walnuts 35, to pass between such relatively movable parts or wires or the like, and they enter the hollow or cylindrical drum, being squeezed or urged or forced into it after their largest transverse dimensions or sectional areas have passed the zone of pressure or constriction caused by the tension upon the wires. They are then picked up by the revolving flights 57 and carried upwardly until they are released and fall into the receptacle or tray E. They may then be withdrawn either by raising a hinge portion of the drum, such as $d$, or by projecting the tray out in the end of the drum, after its end closure 40 is removed. The tension means 49 or 63 at all times keep the relatively movable parts or wires in a condition in which they oppose relative movement or separation yieldingly. This relative movement is also further yieldingly opposed by the tension springs 53 and 56. It will be obvious that the relative adjustment or relative play under tensional opposition, as between the wires 43, due to the relative movement between the portions $37^a$ and $37^b$ of the intermediate frame members such as 37 and 38, may also be provided as between the wires $46^y$ in Figures 24 and 25 or as between the wires 44 and 45 in Figure 26, by introducing into such other forms of drum construction the relatively movable provision which is made with respect to the frame members 37 and 38. In fact, the wires 45 are to be understood as mounted in connection with the intermediate frame members 37 and 38 in Figure 26 in the same manner as they are mounted in connection therewith in the other figures where such intermediate frame members are employed.

The closure 40 is provided with a recess $40^a$ which is centrally arranged and fits over the hub 47 of the brace 46 so as to hold the tray E back in the drum and prevent its slotted portion 72 from being interlocked with such brace 46 to invert the tray E and inadvertently empty its contents.

It is obvious that many changes and modifications and variations may be made in practicing the invention, in departing from the particular features and provisions and parts and members shown in the drawings and set forth in the foregoing description, all, however, without departing from the true spirit and scope of the invention.

Having thus disclosed my invention, I claim and desire to secure by Letters Patent:

1. Means of the character disclosed, comprising a shaft, a rotatable member mounted in connection with the shaft and having openings to receive objects encountered by the rotatable member in its traverse of a surface, and a receptacle mounted in connection with said shaft and within which the recovered objects are deposited; said receptacle being slidably mounted for movement with respect to said member and adapted to be projected beyond said member to permit access to the receptacle.

2. Means of the character disclosed, comprising a shaft, a rotatable member mounted in connection with the shaft and having openings to receive objects encountered by the rotatable member in its traverse of a surface, and a receptacle mounted in connection with said shaft and within which the recovered objects are deposited; said receptacle being slidably mounted for movement with respect to said member and adapted to be projected beyond said member to permit access to the receptacle; said member being substantially cylindrical.

3. Means of the character disclosed, comprising a shaft, a rotatable member mounted in connection with the shaft and having openings to receive objects encountered by the rotatable member in its traverse of a surface, and a receptacle mounted in connection with said shaft and within which the recovered objects are deposited; said member being substantially cylindrical, and said receptacle being slidably connected with said shaft.

4. Means of the character disclosed, comprising a shaft, a rotatable member mounted in connection with the shaft and having openings to receive objects encountered by the rotatable member in its traverse of a surface, and a receptacle mounted in connection with said shaft and within which the recovered objects are deposited; said member being substantially cylindrical, and said receptacle being slidably connected with said shaft; said substantially cylindrical member being provided with a detachably mounted end member which may be removed to permit the projection of said slidably-supported receptacle beyond the end of said member.

5. Means of the character disclosed, comprising a shaft, a rotatable member mounted in connection with the shaft and having openings to receive objects encountered by the rotatable member in its traverse of a surface, and a receptacle mounted in connection with said shaft and within which the recovered objects are deposited; said member being substantially cylindrical, and said receptacle being slidably connected with said shaft; said substantially cylindrical member being provided with a detachably mounted end member which may be removed to permit the projection of said slidably-supported receptacle beyond the end of said member; said member being provided with a transverse brace, and said receptacle being slotted partially lengthwise to accommodate said brace in the outward projection of said receptacle.

6. Means of the character disclosed, comprising a shaft, a rotatable member mounted in connection with the shaft and having openings to receive objects encountered by the rotatable member in its traverse of a surface, and a receptacle mounted in connection with said shaft and within which the recovered objects are deposited; said member being substantially cylindrical, and said receptacle being slidably connected with said shaft; said substantially cylindrical member being provided with a detachably mounted end member which may be removed to permit the projection of said slidably-supported receptacle beyond the end of said member; said receptacle being provided with an opening at one end having a closure, means being provided for normally maintaining the closure in closed position.

7. Means of the character disclosed, comprising a rotating member adapted to traverse a surface and having spaced members between which objects are recovered, a receptacle mounted in connection with such member, and elevating means comprising fixed projecting members connected with said rotatable member in spaced relation and whereby the objects recovered are transferred to said receptacle.

8. Means of the character disclosed, comprising a rotating member adapted to traverse a surface to recover objects therefrom, a receptacle mounted in connection with such member, and elevating means comprising projecting members connected with said rotatable member in spaced relation and whereby the objects recovered are transferred to said receptacle; said rotatable member being substantially cylindrical and said receptacle and elevating means being disposed within such cylindrical member.

9. Means of the character disclosed, comprising a rotating member adapted to traverse a surface to recover objects therefrom, a receptacle mounted in connection with such member, and elevating means comprising projecting members connected with said rotatable member in spaced relation and whereby the objects recovered are transferred to said receptacle; said rotatable member being substantially cylindrical and said receptacle and elevating means being disposed within such cylindrical member; said receptacle being mounted to play lengthwise of said cylindrical member so as to be projected beyond one end thereof to permit access to said receptacle.

10. Means of the character disclosed, comprising a rotating member adapted to traverse a surface to recover objects therefrom, a receptacle mounted in connection with such member, and elevating means comprising projecting members connected with said rotatable member in spaced relation and whereby the objects recovered are transferred to said receptacle; said rotatable member being substantially cylindrical and said receptacle and elevating means being disposed within such cylindrical member; said receptacle being mounted to play lengthwise of said cylindrical member so as to be projected beyond one end thereof to permit access to said receptacle; means being provided for maintaining said receptacle normally chambered within said cylindrical member.

11. Means of the character disclosed, comprising a rotating member adapted to traverse a surface to recover objects therefrom, a receptacle mounted in connection with such member, and elevating means comprising projecting members connected with said rotatable member in spaced relation and whereby the objects recovered are transferred to said receptacle; said rotatable member being substantially cylindrical and said receptacle and elevating means being disposed within such cylindrical member; said receptacle being mounted to play lengthwise of said cylindrical member so as to be projected beyond one end thereof to permit access to said receptacle; means being provided for maintaining said receptacle normally chambered within said cylindrical member; said cylindrical member being provided with relatively movable parts adapted to receive recovered objects between them.

12. Means of the character disclosed, comprising a rotating member adapted to traverse a surface to recover objects therefrom, a receptacle mounted in connection with such member, and elevating means comprising projecting members connected with said rotatable member in spaced relation and whereby the objects recovered are transferred to said receptacle; said rotatable member being substantially cylindrical and said receptacle and elevating means being disposed within such cylindrical member; said receptacle being mounted to play lengthwise of said cylindrical member so as to be projected beyond one end thereof to permit access to said receptacle; means being provided for maintaining said receptacle normally chambered within said cylindrical member; said cylindrical member being provided with relatively movable parts adapted to receive recovered objects between them; said relatively movable parts comprising a plurality of spaced wires extending lengthwise of said cylindrical member.

13. Means of the character disclosed, comprising a rotating member adapted to traverse a surface to recover objects therefrom, a receptacle mounted in connection with such member, and elevating means comprising projecting members connected with said rotatable member in spaced relation and whereby the objects recovered are transferred to said receptacle; said rotatable member being substantially cylindrical and said receptacle and elevating means being disposed within such cylindrical member; said receptacle being mounted to play lengthwise of said cylindrical member so as to be projected beyond one end thereof to permit access to said receptacle; means being provided for maintaining said receptacle normally chambered within said cylindrical member; said cylindrical member being provided with relatively movable parts adapted to receive recovered objects between them; said relatively movable parts comprising a plurality of spaced wires extending lengthwise of said cylindrical member; means being provided for exerting tension upon said wires lengthwise.

14. Means of the character disclosed, comprising a rotating member adapted to traverse a surface to recover objects therefrom, a receptacle mounted in connection with such member, and elevating means comprising projecting members connected with said rotatable member in spaced relation and whereby the objects recovered are transferred to said receptacle; said rotatable member being substantially cylindrical and said receptacle and elevating means being disposed within such cylindrical member; said receptacle being mounted to play lengthwise of said cylindrical member so as to be projected beyond one end thereof to permit access to said receptacle; means being provided for maintaining said receptacle normally chambered within said cylindrical member; said cylindrical member being provided with relatively movable parts adapted to receive recovered objects between them; said relatively movable parts comprising a plurality of spaced wires extending lengthwise of said cylindrical member; means being provided yieldingly holding said wires in spaced relation.

15. Means of the character disclosed, comprising a rotating member adapted to traverse a surface to recover objects therefrom, a receptacle mounted in connection with such member, and elevating means comprising projecting members connected with said rotatable member in spaced relation whereby the objects recovered are transferred to said receptacle; said rotatable member being substantially cylindrical and said receptacle and elevating means being disposed within such cylindrical member; said receptacle being mounted to play lengthwise of said cylindrical member so as to be projected beyond one end thereof to permit access to said receptacle; means being provided for maintaining said receptacle normally chambered within said cylindrical member; said cylindrical member being provided with relatively movable parts adapted to receive recovered objects between them; said relatively movable parts comprising a plurality of spaced wires extending lengthwise of said cylindrical member; said longitudinally extending wires being mounted in criss-cross arrangement to provide a plurality of object-receiving openings bounded each by wires on four sides.

16. Means of the character disclosed, comprising a substantially cylindrical drum having frame members, and relatively movable parts extending between such frame members and adapted to receive objects between them; such relatively movable parts comprising spaced wires; means being provided for exerting tension upon said wires lengthwise.

17. Means of the character disclosed, comprising a substantially cylindrical drum having frame members, and relatively movable parts extending between such frame members and adapted to receive objects between and pass same beyond them; such relatively movable parts comprising spaced wires; means being provided for yieldingly holding said wires in spaced relation.

18. Means of the character disclosed, comprising a substantially cylindrical drum having frame members, and relatively movable parts extending between such frame members and adapted to receive objects between them; said relatively movable parts comprising spaced wires; means being provided for yieldingly holding said wires in spaced relation, and means being provided for exerting tension upon said wires lengthwise.

19. Means of the character disclosed, comprising a substantially cylindrical drum having annular frame members, and relatively movable parts extending lengthwise of the drum and between which objects are adapted to be received, certain of said annular frame members being divided to provide relatively movable concentric portions with which such relatively movable parts are connected.

20. Means of the character disclosed, comprising a substantially cylindrical drum having annular frame members, and relatively movable parts extending lengthwise of the drum and between which objects are adapted to be received, certain of said annular frame members being divided to provide relatively movable concentric portions with which such relatively movable parts are connected; said relatively movable portions of said certain annular members having eyes through which the relatively movable parts loosely extend.

21. Means of the character disclosed, comprising a substantially cylindrical drum having annular frame members, and relatively movable parts extending lengthwise of the drum and between which objects are adapted to be received, certain of said annular frame members being divided to provide relatively movable concentric portions with which such relatively movable parts are connected; said relatively movable portions of said certain annular members having eyes through which the relatively movable parts extend; means being provided for exerting tension upon one of said annular frame members to resultantly impose tension upon said relatively movable parts.

22. Means of the character disclosed, comprising a substantially cylindrical drum having annular frame members, and relatively movable parts extending lengthwise of the drum and between which objects are adapted to be received, certain of said annular frame members being divided to provide relatively movable concentric portions with which such relatively movable parts are connected; said relatively movable portions of said certain annular members having eyes through which the relatively movable parts loosely extend; means being provided for exerting tension upon one of said annular frame members to resultantly impose tension upon said relatively movable parts; said relatively movable parts comprising wires extending lengthwise of said drum.

23. Means of the character disclosed, comprising a substantially cylindrical drum having annular frame members, and relatively movable parts extending lengthwise of the drum and between which objects are adapted to be received, certain of said annular frame members being divided to provide relatively movable concentric portions with which such relatively movable parts are connected; tension means being provided as between said relatively movable portions and yieldingly permitting movement of said relatively movable portions in opposite directions.

24. Means of the character disclosed, comprising a shaft, a drum mounted upon the shaft and comprising frame members, relatively movable parts extending between said frame members and adapted to receive objects between them, and tension means acting upon one of said frame members to cause the relatively movable parts to be tensionally affected.

25. Means of the character disclosed, comprising a shaft, a drum mounted upon the shaft and comprising frame members, relatively movable parts extending between said frame members and adapted to receive objects between them, and tension means acting upon one of said frame members to cause the relatively movable parts to be tensionally affected; said tension means acting between said shaft and one of the frame members.

26. Means of the character disclosed, comprising a member having relatively movable parts the relative movement of which is yieldingly opposed, said member being adapted to be passed over a surface upon which are disposed objects to be recovered whereby the pressure of such member causes the objects to relatively separate said movable parts and pass between and beyond the same; tension means being provided to produce such yielding opposition to relative movement of said parts.

27. Means of the character disclosed, comprising a member having relatively movable parts the relative movement of which is yieldingly opposed, said member being adapted to be passed over a surface upon which are disposed objects to be recovered whereby the pressure of such member causes the objects to relatively separate said movable parts and pass between the same; tension means being provided to produce such yielding opposition to relative movement of said parts; said relatively movable parts comprising spaced wires, and said tension means exerting a strain upon said wires lengthwise of the same.

28. Means of the character disclosed, comprising a member having relatively movable parts the relative movement of which is yieldingly opposed, said member being adapted to be passed over a surface upon which are disposed objects to be recovered whereby the pressure of such member causes the objects to relatively separate said movable parts and pass between the same; tension means being provided to produce such yielding opposition to relative movement of said parts; said relatively movable parts comprising spaced wires, and said tension means exerting a strain upon said wires to oppose relative separation of the same.

29. Means of the character disclosed, comprising a member having relatively movable parts the relative movement of which is yieldingly opposed, said member being adapted to be passed over a surface upon which are disposed objects to be recovered whereby the pressure of such member causes the objects to relatively separate said movable parts and pass between the same; tension means being provided to produce such yielding opposition to relative movement of said parts; said relatively movable parts comprising spaced wires, and said tension means exerting a strain upon said wires to oppose relative separation of the same and also to exert a strain upon the same lengthwise.

30. Means of the character disclosed, comprising a member having relatively movable parts the relative movement of which is yieldingly opposed, said member being adapted to be passed over a surface upon which are disposed objects to be recovered whereby the pressure of such member causes the objects to relatively separate said movable parts and pass between the same; tension means being provided to produce such yielding opposition to relative movement of said parts; said relatively movable parts comprising spaced wires, and said tension means exerting a strain upon said wires to oppose relative separation of the same, and also to exert a strain upon the same lengthwise; said member comprising a rotatable drum within which the recovered objects are received.

In testimony whereof, I have signed my name to this specification.

JASPER C. BROWN.